R. R. WEAVER.
DROP DOOR SHAFT OPERATING MEANS.
APPLICATION FILED MAR. 5, 1914.
1,122,179.
Patented Dec. 22, 1914.
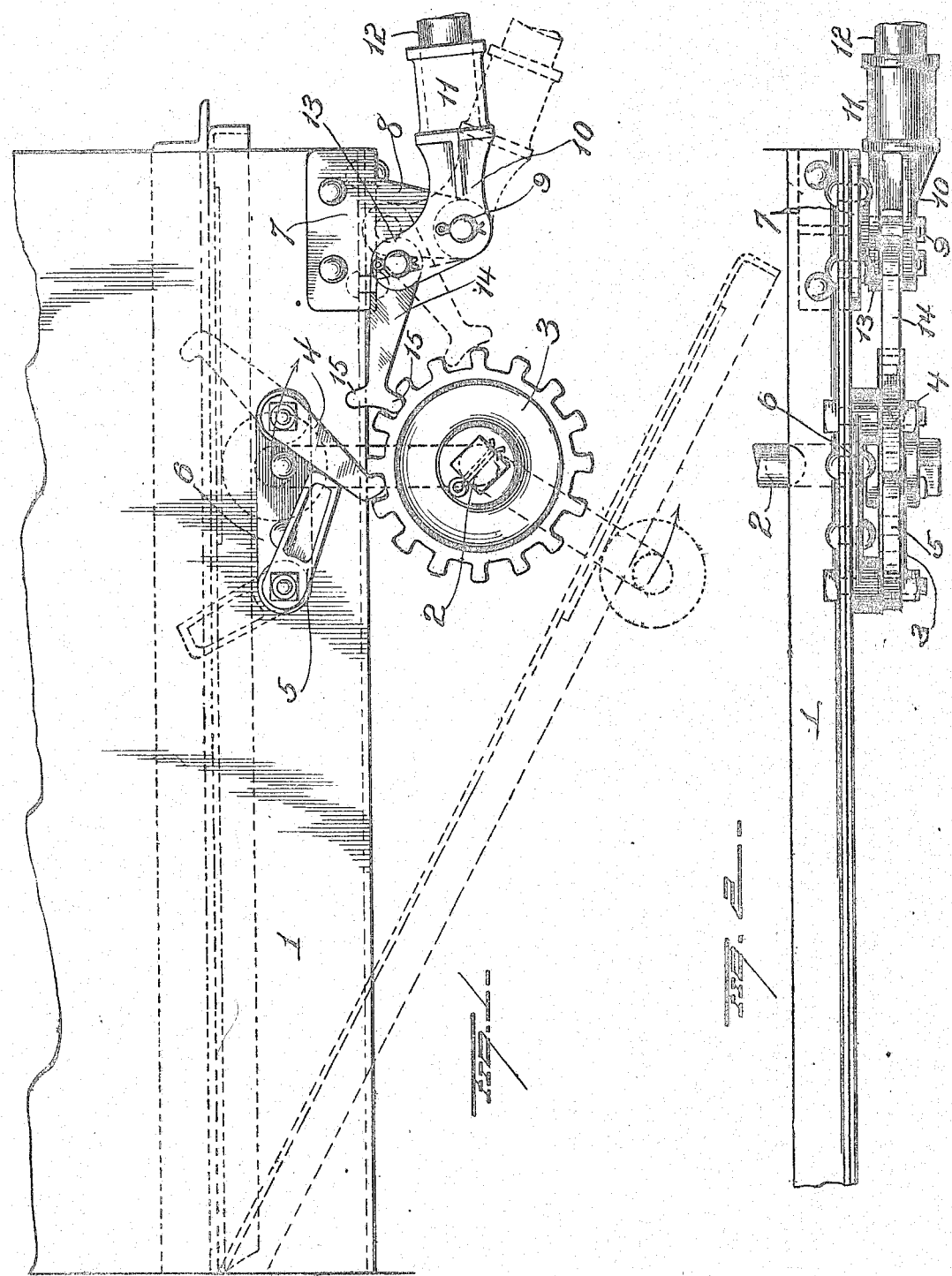
WITNESSES
INVENTOR
*R. R. Weaver*
By *H. A. Seymour*
Attorney

UNITED STATES PATENT OFFICE.

ROBERT R. WEAVER, OF COLUMBUS, OHIO, ASSIGNOR TO THE RALSTON STEEL CAR COMPANY, OF COLUMBUS, OHIO.

DROP-DOOR-SHAFT-OPERATING MEANS.

1,122,179.  Specification of Letters Patent.  Patented Dec. 22, 1914.

Application filed March 5, 1914. Serial No. 822,703.

*To all whom it may concern:*

Be it known that I, ROBERT R. WEAVER, of Columbus, in the county of Franklin and State of Ohio, have invented certain new and useful Improvements in Drop-Door-Shaft-Operating Means; and I do hereby declare the following to be a full, clear, and exact description of the invention, such as will enable others skilled in the art to which it appertains to make and use the same.

This invention relates to improvements in operating mechanism for drop bottom cars, and more particularly to means for actuating the crank shaft by means of which the drop doors are raised and held in normal position, or permitted to lower,— the object of the invention being to obviate the use of gearing for imparting motion to the crank shaft and to provide simple and efficient means whereby said crank shaft may be readily actuated either to close or to open the drop doors without danger of undue shock or strain on any of the parts and by means of which adequate power may be imparted to the crank shaft with a minimum expenditure of energy.

With this and other objects in view, the invention consists in certain novel features of construction and combinations of parts as hereinafter set forth and pointed out in the claim.

In the accompanying drawings, Figure 1 is an elevation illustrating an embodiment of my improvements, and Fig. 2 is a plan view.

1 represents a fragmentary portion of the end of a car, and 2 the shaft (usually a crank shaft) for operating the drop doors of a drop bottom car. The specific construction and arrangement of the drop doors and the manner of associating the crank shaft therewith are not essential to an understanding of my present invention and may be of any of the types well known in the art.

A ratchet wheel 3 is secured to one end of the door-operating crank shaft 2, and is normally engaged by a dog 4 to prevent the crank shaft from turning when the doors are closed. The dog 4 held in engagement with the ratchet wheel by means of a gravity lock 5, and said dog and lock are pivotally attached to a block 6 secured to the end of the car.

A bracket 7 is secured to the end of the car (preferably the end sill) laterally from the ratchet wheel, and at the lower end of the depending portion 8 of this bracket, a horizontally disposed pin 9 is provided. The pin 9 constitutes a fulcrum for a bell-crank 10,—the arm 11 of which is made to form a socket which receives a hand lever 12. The bell-crank and lever 12 thus constitute an operating lever pivoted at 9 and the arm 13 of the bell-crank is bifurcated and between the ends of its members, one end of a dog 14 is pivotally attached. The other end of this dog is provided with two teeth 15, 15, so that said dog may be made to engage the ratchet wheel either above or below its axis.

From the construction and arrangement of parts above described, it will be seen that when the shaft 2 shall have been released by throwing out the dog 6, and the hand-operating lever is oscillated on its pivotal support, the engagement of a tooth of the dog 14 with the ratchet wheel 3 will cause the door-operating crank shaft to be turned to open or close the doors according to the direction of rotation of said shaft,—which direction of rotation is determined by engagement of the dog 14 with the ratchet wheel above or below its axis.

My improvements provide simple and efficient means for applying power for rotating the door-operating crank shaft, with a minimum expenditure of energy, and furthermore, the parts will not be subjected to excessive shock and wear when the doors drop quickly under a heavy load and cause a rapid rotation of the crank shaft, as would be the case of gearing employed for imparting motion to the crank shaft.

Slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

The combination with a drop door operating shaft, a ratchet wheel secured to said shaft, and a fixed support independent of the shaft, of a bell-crank pivotally mounted at its apex on said fixed support laterally from the ratchet wheel, one arm of the bellcrank projecting upwardly from its pivotal support and the other arm projecting outwardly, a dog pivoted to the upwardly projecting arm and projecting inwardly toward the ratchet wheel, said dog having an upwardly projecting tooth and a downwardly projecting tooth to coöperate with the ratchet wheel, and a lever handle attached to the outwardly projecting arm of the bellcrank.

In testimony whereof, I have signed this specification in the presence of two subscribing witnesses.

ROBERT R. WEAVER.

Witnesses:
C. H. WEBER,
M. T. HEWITT.